United States Patent [19]
Fleishman

[11] Patent Number: 5,284,351
[45] Date of Patent: Feb. 8, 1994

[54] RECUMBENT BICYCLE

[76] Inventor: Gregg R. Fleishman, 2732 S. La Cienega, Los Angeles, Calif. 90034

[21] Appl. No.: 727,553

[22] Filed: Jul. 9, 1991

[51] Int. Cl.⁵ .......................... B62K 3/02; B62M 1/02
[52] U.S. Cl. ................. 280/259; 280/281.1; 280/288.1
[58] Field of Search ............... 280/259, 288.1, 288.2, 280/288.3, 281.1; 712/111, 112

[56] References Cited
U.S. PATENT DOCUMENTS

| | | | |
|---|---|---|---|
| 4,303,256 | 12/1981 | Mortensen | 280/288.1 |
| 4,453,730 | 6/1984 | Klose | 280/281.1 |
| 4,480,848 | 11/1984 | Georgiev | 280/288.1 |
| 4,659,098 | 4/1987 | Jacobson | 280/288.1 |
| 4,773,663 | 9/1988 | Sawyer et al. | 280/288.1 |

FOREIGN PATENT DOCUMENTS 425370  7/1948  Italy .................................. 280/288.1

Primary Examiner—Mitchell J. Hill
Attorney, Agent, or Firm—Lyon & Lyon

[57] ABSTRACT

A recumbent bicycle that has a short main frame, a small front wheel, a hub and crank that is in close proximity of the steering tube, and an aesthetically designed and integrally mounted shock absorber seat.

11 Claims, 3 Drawing Sheets

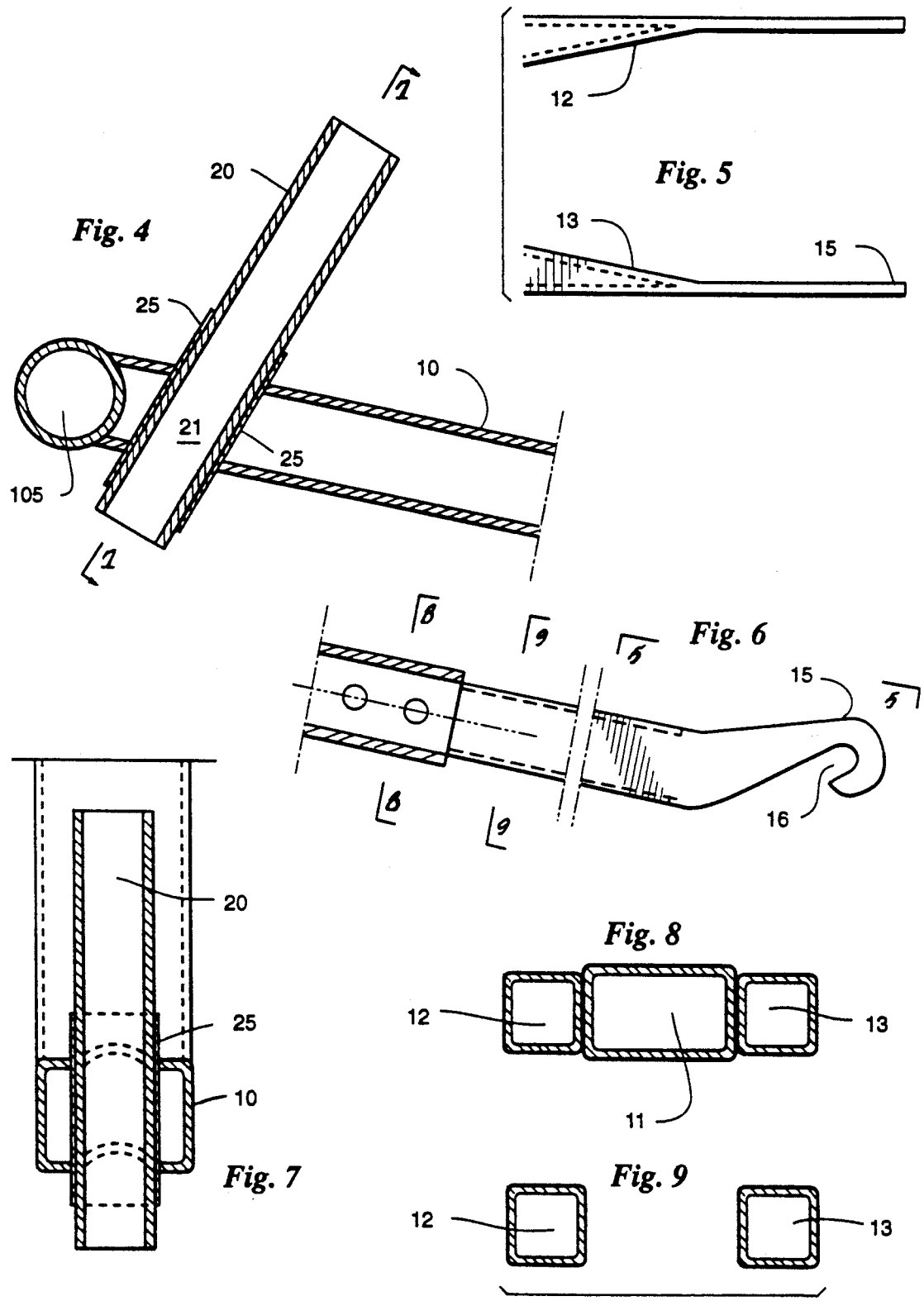

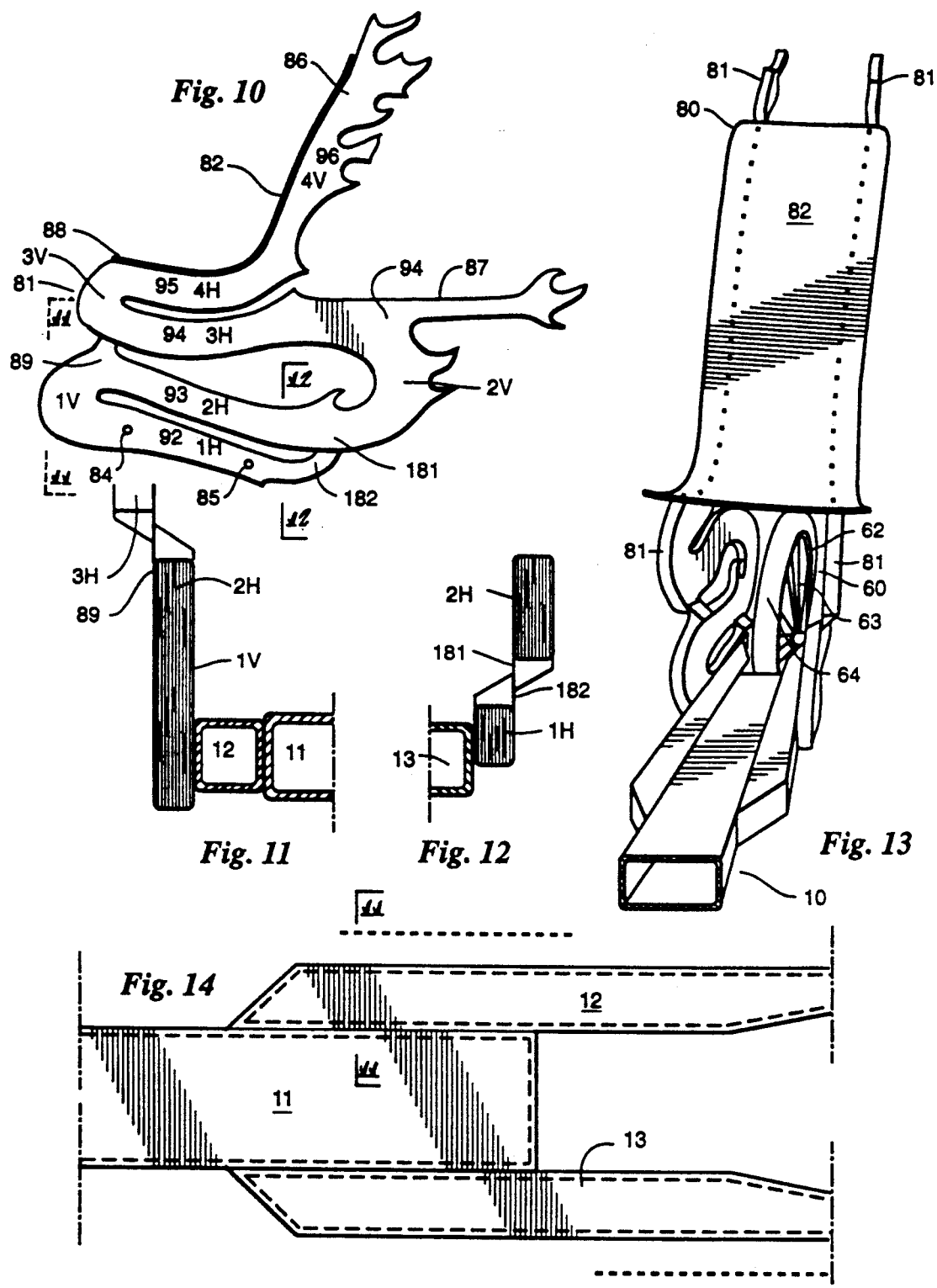

RECUMBENT BICYCLE

BACKGROUND OF THE INVENTION

Previous bicycle designs are generally of two general types: (1) A "traditional" upright design (where the rider is generally upright and leaning forward toward the handlebars) this is utilized in a number of configurations, including racing bikes, touring bikes, mountain bikes, and portable bikes (although generally these have different types of frames); and (2) recumbent bicycles, where the operator sits in a generally lower and more reclined position than that employed in traditional bicycles. A recumbent bicycle primarily enhances rider comfort and aerodynamic efficiency. For the casual user, it has a safer feeling, lowered head position, with hands and feet in front of and protecting rider's body in the event of a fall. Further, the possibilities for enclosure of this type of bicycle make it effective as a commuter vehicle in rainy weather. The improved recumbent bicycle is constructed in such a manner as to further optimize portability, maneuverability, aesthetic design, engineering practicality and simplicity of manufacture.

Although introduced to the riding public in the 1930's, the recumbent bicycle has not yet been successful commercially. Two varieties of recumbents have dominated the effort, of which one (variety A) generally consists of a long multitube frame with the crank assembly placed low down and rearward from the steering tube (head tube) 10"-14" to allow the crank arms to clear the back of the front wheel when the bicycle is being pedaled. Although the overall look of this configuration is that of a "chopper" motorcycle and thus attractive from a marketing point of view, it also results in a long turning radius (low maneuverability) and high costs and weight.

A second variety (B) places the crank assembly 12" to 14" in front of the steering tube in a generally higher position so that when pedaled the heels of the rider's feet clear the front of the front wheel. The shorter turning radius, lighter weight and lower cost bike that results is advantageous (it is similar to a traditional bicycle) but this is negated by the unattractive appearance of the crank set and sprocket sticking well out in front of the front wheel.

The present invention comprises an improved recumbent bicycle that will offer some of these inherent advantages of a traditional bicycle, and recumbent variety B (as above), such as maneuverability, light weight, and portability plus the attractive look of the "chopper" motorcycle as in recumbent variety A, combined with the basic advantages inherent in the recumbent bicycle of comfort and aerodynamic efficiency.

SUMMARY OF THE INVENTION

The present invention is a recumbent bicycle that combines the advantages of a traditional bicycle and a recumbent bicycle as listed above while manifesting other improvements, such as a single tube frame and cantilevered seat. A compact design enhances maneuverability and portability, while retaining the conventional recumbent bicycle design advantages of comfort and aerodynamic efficiency.

Improvements over the conventional recumbent bicycle design are: First, the crank has been moved generally in the region (±6") of the steering tube. The position of the crank in the region of the steering tube, necessitated a redesign of the traditional crank arm and pedal configuration to avoid entanglement of the operator's feet and garments with the sprocket, chain, and front wheel during operation. This was accomplished by redesigning the shape of the crank arms and the positioning of the pedals. Therefore, the crank arms were shaped so as to spread them apart from the crank hub. The pedals were then positioned so as to increase the spacing between the pedals and the sprocket, chain, and front wheel, while enabling efficient transfer of power from the operator.

Second, small front and rear wheels are used to contribute to the reduction in overall length, also allowing the rear wheel to be positioned somewhat under the seat.

Third is the design of the frame in which a single relatively large tube is used as the main frame element replacing the multitube frames usually used in bicycles and thus reducing cost. Also important is a simplification in the look of the bike to balance its increased frame length relative to that of traditional bikes.

The fourth advantage is the shape and position of the seat. The seat is designed to be attached to the frame by conventional means forward of the rear wheel hub. The distance above the small rear wheel and single tube frame allows that the seat be cantilevered above the frame, providing a suspension system for additional comfort.

To summarize, the overall design of the bicycle is aesthetically pleasing. It maintains the look of a "chopper" motorcycle. Yet, the design is simple, (the compact main frame can be constructed from as few as three pieces) which will result in engineering practicality and lower manufacturing costs. Also, the bike is as short as practicable, which allows for maneuverability and portability and it still embodies the basic advantages of the recumbent of comfort and aerodynamic efficiency.

BRIEF DESCRIPTION OF THE DRAWINGS

A more thorough disclosure of the features of the present invention is set out in the detailed descriptions of the drawings which are described below:

FIG. 4 is a section view of the connection between the main frame (10), the steering tube (20), and a stiffener (25) which assists the fastening of the steering tube (20) to the main frame (10).

FIG. 5 is a segmented top view of the rear portion of the frame taken along section A—A.

FIG. 6 is a segmented side section view of the rear portion of the main frame (10) shown in FIG. 5, depicting the shape of the notches or rear drop outs (16) where the rear hub (61) is attached.

FIG. 7 is a segmented section view of the connection between the main frame (10), steering tube (20) and stiffener (25), taken along section B—B in FIG. 4.

FIG. 8 is a cross-sectional view of the three tubes (not necessarily rectangular) that comprise the main frame (10): the main tube (11), the left tube (12) and the right tube (13), taken along section C—C in FIG. 6.

FIG. 9 is a cross-sectional view of the two outer tubes that extend rearward of the main tube (11): the left tube (12) and the right tube (13), taken along section D—D in FIG. 6.

FIG. 10 is a side view of the vertical support members 81 that provide the support for the seat surface 82.

FIG. 11 is a fragmented rear view of part of the main tube 11, left tube 12, the bottom portion of the vertical support member 81 (taken along section F—F in FIG. 10), shown as the area indicated by the point 89 in FIG. 10 and the top portion of the vertical support members 81, shown as the area indicated by point 88 in FIG. 10. FIG. 11 illustrates how the overlap serves as a guide so that the top portion can move up and down in line in relation to the bottom portion FIG. 12 is a fragmented portion of the rear view of the right tube 13, taken along section E13 E in FIG. 10, the middle portion of the vertical support member 81, shown as the area indicated by the point 181 in FIG. 10 and the bottom portion of the vertical support members 81, shown as the area indicated by point 182 in FIG. 10. FIG. 12 illustrates how the overlap serves as a guide so that the middle portion can move up and down in line in relation to the bottom portion.

FIG. 13 is a perspective front view of the rear wheel 60, seat 80, and main frame 10 assembly.

FIG. 14 is a top view of the middle portion of the main frame 10. It illustrates the connection and shape of the main tube 11, the left tube 12, and the right tube 13.

DETAILED DESCRIPTION OF THE PREFERRED EMBODIMENT

The present invention relates to a recumbent bicycle that has, inter alia, a short main frame, a small front wheel, a hub and crank assembly that is adjacent to the steering tube, and an integrally mounted, cantilevered, shock absorber seat.

Figure 1:
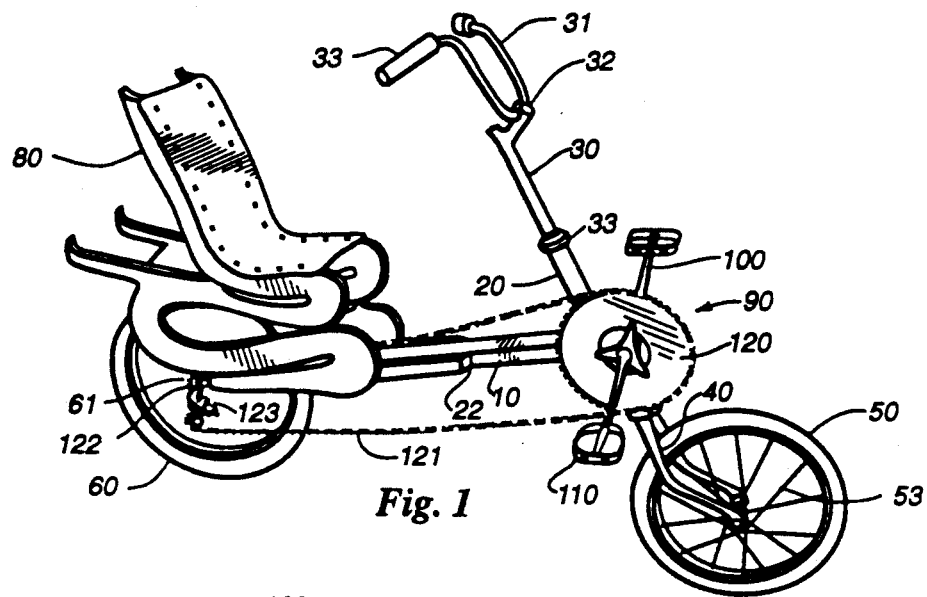
FIG. 1 is a perspective view of the complete assembled recumbent bicycle which includes a view of the front wheel (50), front forks (40), crank assembly (90) including crank arms (100), pedals (110), and front sprocket (120), steering tube (20), steering mechanism (30), main frame (10), seat (80), and rear wheel (60).
Figure 2:
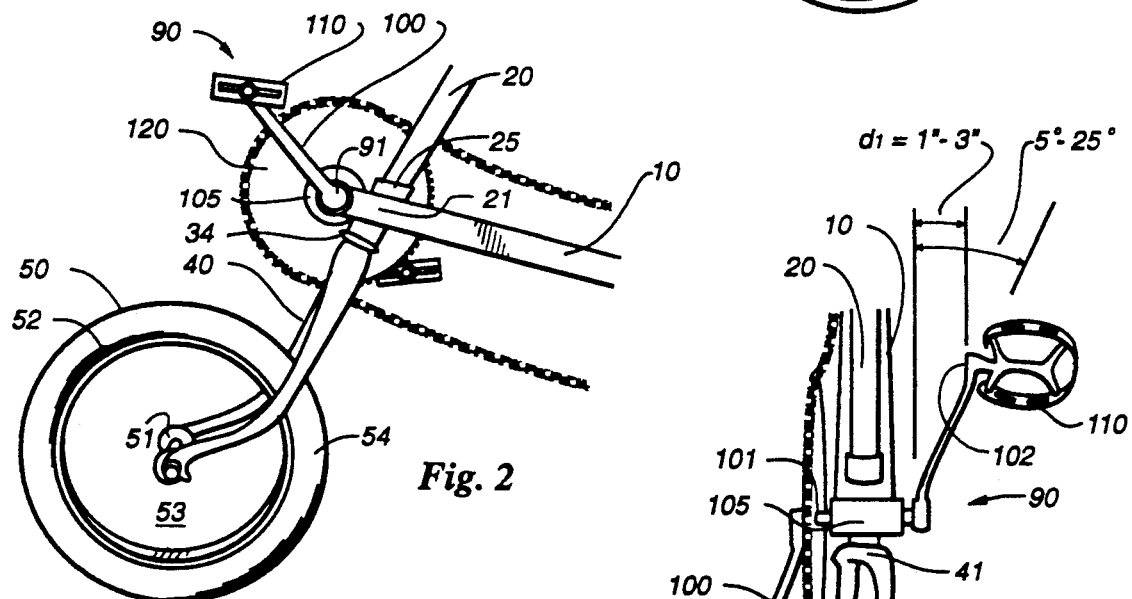
FIG. 2 is a side view of the front wheel (50), including rim (52), spokes (53), and front tire (54), front forks (40), crank assembly (90) including crank arms (100), front sprocket (120), crank hub (sometimes called a bottom bracket) (105), and pedals (110), lower races (34) and the front portion of the main frame (10).
Figure 3:
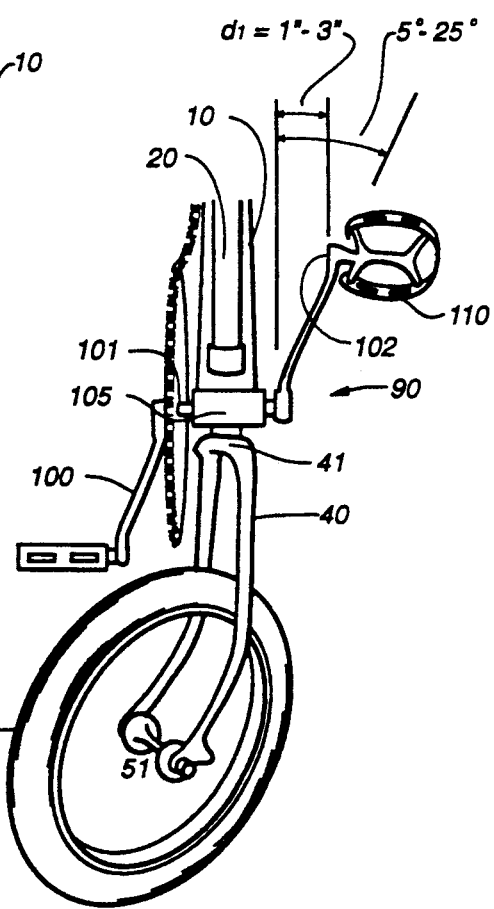
FIG. 3 is a front view of the front wheel (50), front forks (40), crank assembly (90) including spindle (101), crank arms (100), crank hub (105), and pedals (110), steering tube (20), main frame (10), with dimensions that indicate outward spreading of crank arms from main frame (10).

Turning now to a detailed description of the preferred embodiment, illustrated in FIGS. 1, 2, and 3 of the drawings. FIG. 1 depicts the construction of the bicycle as a whole. The main frame is a generally horizontal structure that is constructed of one or more tubes aligned parallel along the same axis and connected with conventional means, such as welding or nuts and bolts. The preferred embodiment comprises three generally rectangular tubes that are attached to form a rigid frame. The main tube 11 is attached to a left tube 12 and a right tube 13. The main tube 11 extends to the front of the bicycle, forward of the steering tube 20. The most forward points of the left tube 12 and the right tube 13 are shown as point 22 on FIG. 1. The left tube 12 and the right tube 13 extend rearward of the main tube 11 as shown in FIGS. 5 and 14 and are formed into a bracket 15 with notches or rear drop out 16 suitable for supporting the rear hub 61, the rear wheel sprocket 122, and the rear wheel 60.

A steering tube 20 extends through a hole formed through the main frame 10 at point 21, as depicted in FIGS. 2, 4 and 7. The steering tube 20 is rigidly attached by conventional means to the main tube 11 at point 21 on FIGS. 2 and 4. A stiffener cylinder plate 25 assists in the attachment. A steering mechanism 30 and the upper portion of the front forks 40 are inserted through the steering tube 20 in a conventional manner such that the steering mechanism 30 is adjustable vertically through telescopic means. The upper portion of the front forks 40 are is connected by bearings (not shown) at races 33 and 34 so that it cannot move in a vertical direction but can rotate up to 180 degrees within the steering tube 20 to enable turning he front wheel.

In the preferred embodiment, steering may be accomplished by use of conventional bicycle handlebars 31 which are rotatably attached to the steering mechanism 30 by conventional means at point 32 on FIG. 1. The handlebars are elongated to enhance the "chopper" motorcycle look and provide a comfortable rider position. Rubber handgrips 33 are positioned on the ends of the handlebars 31 to provide a firm grip. When the bolt i.e. (conventional attachment means) is loosened at point 32 the handlebars 31 are rotated about point 32 thus moving the handgrip portion 33 either closer to or further from the rider location.

The upper portion of front forks 40 is a tube fitting inside of steering tube 20 and attached to the steering mechanism 30 in a conventional fashion and as previously described. It extends below the main frame 10 to shoulder 41 on FIG. 3. The lower portion of front forks 40 are comprised of two generally vertical members that connect to shoulder 41 and are spread far enough to allow free rotation of the front wheel 50. The bottom of the front forks 40 is shaped with notches or front drop outs so as to allow mating of the front wheel hub 51. The front wheel 50 is relatively small and is connected to the front forks by the front wheel hub 51. The front wheel 50 is a conventional bicycle wheel with a rim 52, spokes 53, and a rubber tire 54 as illustrated in FIG. 2. The front wheel hub 51 is a ball bearing device that will allow free rotation of the front wheel 50.

The crank assembly 90 consists of the crank hub 105 (called a bottom bracket in a conventional bike frame) that is attached to the main frame 10 in front of and in close proximity to the steering tube 20 (see FIGS. 2 and 4). The crank hub contains a conventional spindle 101 retained by ball bearings, not shown, which allow the crank arms 100 to spin freely in a forward or backward direction. The crank arms 100 are attached to the spindle 101 at point 91 so as to allow no sidewise movement and free rotational movement. The crank arms 100 may be attached to the spindle in a variety of conventional ways. They are spread a dimension $d_1$ as indicated in FIG. 3 to allow for clearance of the operator's feet and garments during operation. The distance that the crank arms 100 are spread has been ergonomically designed to optimize the clearance of the pedals 110 from the front wheel 50, when the wheel is positioned angularly and the bicycle is turning, while still positioning the pedals to retain maximum operator efficiency. The crank arms spread angle is shown in FIG. 3. The pedals 110 are attached conventionally to the crank arms 100 at point 102, shown in FIG. 3. They are attached so as to allow them to rotate but not to allow sideways movement.

The rear hub 61 is attached to the main frame 10 by inserting the ends of the rear hub 61 into the notches 16 of the rear brackets 15 (also called "rear drop outs") as shown in FIG. 6. The rear hub 61 is a conventional bicycle hub constructed with ball bearings, which allows the rear wheel to spin freely in a forward or backward direction. The rear wheel 60 is connected to the rear portion of the frame by the rear hub 61. The rear wheel 60 is a conventional bicycle wheel with a rim 62, spokes 63, and a rubber tire 64 as illustrated in FIG. 13.

FIGS. 10 through 13 depict the preferred embodiment of the seat 80. The seat 80 is comprised of three major components: two vertical multicurve cantilever support members (hereinafter vertical support members or vertical cantilevers) 81 which act as a planar spring and a seat surface 82. Each of the vertical support members 81 is attached to the main frame 10 by a forward mounting means and a rear mounting means at points 84 and 85 shown in FIG. 10. The vertical support members 81 are shaped so as to allow mounting of the seat surface 82, to provide a rack for carrying items, and to allow for flexing to act as a shock absorber via the multicurve cantilever configuration which acts as a planar spring to provide increased comfort to the rider. FIG. 10 shows the shape of the vertical support members 81. They are each preferably constructed out of a single piece of wood (in the best mode Finland birch plywood) with a curvilinear shape, fashioned to create four interconnected substantially horizontal members 92-95 connected to an upwardly extending vertical section 96. The planar spring is formed by four (4) substantially horizontal members 92(also labeled 1H), 93(2H), 94(3H) and 95(4H) and four substantially vertical members 1V, 2V, 3V and 4V (96). Each vertical support member 81 in the best mode is designed with ornamentation to add to the aesthetic value. The top of each vertical support member 81 is shaped in a generally vertical fashion to enable its use as a back rest (see area indicated by point 86 on section 96(4V) in FIG. 10). The rear part of each vertical support member 81 is fashioned to enable its use as a luggage rack (see area indicated by point 87 on section 94 in FIG. 10).

The vertical support members 81 are further shaped to enable the front part of the seat supported by elements 94 and 95 (see area indicated by point 88 in FIG. 10) to overlap on the outside of the bottom half of the seat supported by elements 92 and 93 (see area indicated by point 89 in FIG. 10). More specifically, element 3H (where it merges into 3V) overlaps element 2H (where it merges into 1V). The overlap serves as a guide so that the top half 88 can act as a cantilever axial spring and flex downward in order to dampen the ride and act as a shock absorber. This is illustrated in FIG. 11, where a front view of the top half of the seat 88 overlapping the bottom half 89 is shown.

The vertical support members 81 are also shaped to enable the rear outer two horizontal portions of the seat to overlap the bottom member in a similar manner to that described above. This is illustrated in FIGS. 10 and 12, where the area indicated by point 181 is shown overlapping the area indicated by point 182. More specifically, element 2H (where it merges into 2V) overlaps element 1H. This enables the rear portion of the seat to act as a planar spring shock absorber in a similar manner as described above.

The seat surface 82 is attached by conventional means to the top surface of the vertical support members 81 as shown in FIGS. 1 and 13. The preferred embodiment of the seat surface 82 is constructed of a flexible wood that can be shaped to the contours of the vertical support members 81 as shown in FIG. 1.

The overall design of the seat 80 in relation to the main frame 10 and the rear wheel 60 is shown in FIG. 13. The design of the seat 80 and the method of attachment enables the seat 80 to be placed in the optimum position relative to the ground and as far to the rear as possible. This optimizes the design of the bike in that it reduces the overall size and promotes efficient transfer of power from the operator to the drive means.

The drive means of the preferred embodiment comprises a front sprocket 120, a chain 121, and a rear sprocket/derailleur combination 122-123 (see FIG. 1). The front sprocket is attached to the crank assembly 90 and is a typical conventional sprocket (although perhaps larger than normal), notched to engage the chain links to transfer power from the crank to the rear wheel 60. The chain 121 is a conventional bicycle chain (although longer than normal) that extends from the front sprocket 120 to the rear sprocket 122. The rear sprocket 122 is attached to the rear hub 61. During forward operation of the crank set 90 and the chain 121, the chain 121 will engage the rear sprocket and cause the rear wheel 60 to turn, causing the bicycle to move forward. When the front sprocket 120 and the chain 121 are idle, the rear sprocket 122 and rear hub 61 combination will allow the rear wheel 60 to turn freely. The preferred embodiment can be constructed with as little as a single gear, or multiple gears and a derailleur can be used.

The preferred embodiment will use conventional bicycle brake means (not illustrated on the enclosed drawings), comprising front and rear brake systems. Each brake system will comprise a pair of brake levers mounted on each side of the handlebars 31 near the rubber grips 33, a rear brake mechanism attached to the main frame 10, a front brake mechanism attached to the front forks 40, and a cable to connect the brake levers to the brake mechanisms.

While embodiments and applications of this invention have been shown and described, it is apparent to those skilled in the art that many more modifications are possible without departing from the inventive concepts herein described. The invention, therefore, is not to be restricted except as is necessary by the prior art and by the spirit of the appended claims.

I claim:

1. A bicycle comprised of:
   (a) a main frame having a front portion and rear portion;
   (b) a steering tube attached near the front portion of said main frame;
   (c) a steering mechanism rotatably engaged in said steering tube;
   (d) front forks attached to said steering mechanism;
   (e) a front wheel rotatably attached to the front forks;
   (f) a rear wheel rotatably attached to the rear portion of said main frame;
   (g) a seat mounted on said main frame in front of and above the rear wheel;
   (h) drive means for powering the bicycle forward by the pedaling of the rider comprising a crank assembly attached to said main frame in close proximity of the steering tube;
   (i) said crank assembly comprising a spindle and a pair of crank arms attached to the spindle, and pedals attached to the crank arms, said pedals spaced outwardly to allow wheel clearance during operation;
(j) said drive means comprising a device for transferring power from the crank assembly to the rear wheel; and
(k) wherein the crank arms are spread outwardly at an angle of from 5° to 25°.

2. A bicycle comprised of:
(a) a main frame having a front portion and rear portion;
(b) a steering tube attached near the front portion of said main frame;
(c) a steering mechanism rotatably engaged in said steering tube;
(d) front forks attached to said steering mechanism;
(e) a front wheel rotatably attached to the front forks;
(f) a rear wheel rotatably attached to the rear portion of said main frame;
(g) a seat mounted on said main frame in front of and above the rear wheel;
(h) drive means for powering the bicycle forward by the pedaling of the rider comprising a crank assembly attached to said main frame in close proximity of the steering tube;
(i) said crank assembly comprising a spindle and a pair of crank arms attached to the spindle, and pedals attached to the crank arms, said pedals spaced outwardly to allow wheel clearance during operation;
(j) said drive means comprising a device for transferring power from the crank assembly to the rear wheel; and
(k) wherein said main frame comprises a main tube and at least one other rear tube on either side thereof which tubes are attached along the same generally horizontal axis to from a one piece, co-planar, rigid frame.

3. A bicycle comprised of:
(a) a main frame having a front portion and rear portion;
(b) a steering tube attached near the front portion of said main frame;
(c) a steering mechanism rotatably engaged in said steering tube;
(d) front forks attached to said steering mechanism;
(e) a front wheel rotatably attached to the front forks;
(f) a rear wheel rotatably attached to the rear portion of said main frame;
(g) a seat mounted on said main frame in front of and above the rear wheel;
(h) drive means for powering the bicycle forward by the pedaling of the rider comprising a crank assembly attached to said main frame in close proximity of the steering tube;
(i) said crank assembly comprising a spindle and a pair of crank arms attached to the spindle, and pedals attached to the crank arms, said pedals spaced outwardly to allow wheel clearance during operation;
(j) said drive means comprising a device for transferring power from the crank assembly to the rear wheel;
(k) wherein said seat comprises an integrated shock absorbing means for cushioning the rider from rough road impact;
(l) wherein the shock absorbing means for the seat comprise first, second and third substantially vertical portions and first, second, third and fourth substantially horizontal portions acting as a planar spring.

4. The bicycle described in claim 3 wherein the second substantially horizontal portion of the cantilever engages and overlaps the first substantially horizontal portion.

5. The bicycle described in claim 4 wherein the third substantially horizontal portion of the cantilever engages and overlaps the second substantially horizontal portion.

6. The bicycle described in claim 3 wherein the fourth substantially horizontal portion of the cantilever engages and overlaps the third substantially horizontal portion.

7. A bicycle comprised of:
(a) a main frame having a front portion and rear portion;
(b) a steering tube attached near the front portion of said main frame;
(c) a steering mechanism rotatably engaged in said steering tube;
(d) front forks attached to said steering mechanism;
(e) a front wheel rotatably attached to the front forks;
(f) a rear wheel rotatably attached to the rear portion of said main frame;
(g) a seat mounted on said main frame in front of and above the rear wheel;
(h) drive means for powering the bicycle forward by the pedaling of the rider comprising a crank assembly attached to said main frame in close proximity of the steering tube;
(i) said crank assembly comprising a spindle and a pair of crank arms attached to the spindle, and pedals attached to the crank arms, said pedals spaced outwardly to allow wheel clearance during operation;
(j) said drive means comprising a device for transferring power from the crank assembly to the rear wheel;
(k) wherein said seat comprises and integrated shock absorbing means for cushioning the rider from rough road impact;
(l) wherein said seat is constructed of a wooden material;
(a) (a) said substantially vertical support member is constructed in a curvilinear fashion wherein there are a plurality of a substantially horizontal segments that overlap each other to act as a shock absorber.

8. A recumbent bicycle comprised of:
(a) a frame with a front end and a rear end;
(b) a steering tube also attached to the front end of said frame;
(c) means for steering positioned within said steering tube;
(d) a front wheel rotatably connected to the means for steering;
(e) The rear end of said frame including rear drop outs;
(f) a rear wheel rotatably connected to a rear sprocket and rotatably held in position at said rear drop outs;
(g) a bottom bracket attached to the front end of said frame;
(h) means for powering the bicycle including a sprocket rotatably mounted in said bottom bracket which communicates with and is connected to said rear sprocket, via a chain;

(i) pedals mounted to said sprocket and crank arms connecting said pedals to said sprocket;
(j) wherein the steering tube and bottom bracket are in close proximity;
(k) wherein the bottom bracket is in front of said steering tube;
(l) wherein said petals are widely positioned;
(m) by means of outwardly sloping crank arms.

9. The recumbent bicycle of claim 8 wherein the frame is a single main tube extending from the bottom bracket to the rear wheel.

10. The recumbent bicycle of claim 9 wherein the frame includes at least two additional tubes sandwiching the single main tube and extending rearwardly for attaching the rear wheel.

11. A recumbent bicycle frame, having front and rear ends comprising:
(a) a single main tube sloping upwardly from the rear end;
(b) the rear end of said main tube having a first means for rotatably supporting a rear wheel;
(c) the front end of said main tube having a steering tube adapted for rotatably receiving the front forks and a second means for supporting a crank assembly positioned in close proximity to said steering tube;
(d) said frame having a third means for supporting a seat in proximity of the rear end of said frame; and
(e) wherein the first means for rotatably supporting the rear wheel includes at least two additional tubes sandwiching the single main tube and extending rearwardly.

* * * * *